US011936715B2

(12) United States Patent
Zhao

(10) Patent No.: US 11,936,715 B2
(45) Date of Patent: Mar. 19, 2024

(54) MULTI-MACHINE WIRELESS SYNCHRONOUS RECORDER, MULTI-TRACK RECORDING SYSTEM AND METHOD

(71) Applicant: CME PTE. LTD., Singapore (SG)

(72) Inventor: Yitian Zhao, Beijing (CN)

(73) Assignee: CME PTE. LTD., Singapore (SG)

( * ) Notice: Subject to any disclaimer, the term of this patent is extended or adjusted under 35 U.S.C. 154(b) by 136 days.

(21) Appl. No.: 17/534,054

(22) Filed: Nov. 23, 2021

(65) Prior Publication Data
US 2022/0086216 A1 Mar. 17, 2022

Related U.S. Application Data

(63) Continuation of application No. PCT/CN2020/072908, filed on Jan. 19, 2020.

(30) Foreign Application Priority Data

May 23, 2019 (CN) .......................... 201910432023.2

(51) Int. Cl.
*H04L 67/025* (2022.01)
*H04L 67/06* (2022.01)
(Continued)

(52) U.S. Cl.
CPC ............ *H04L 67/025* (2013.01); *H04L 67/06* (2013.01); *H04L 67/1095* (2013.01);
(Continued)

(58) Field of Classification Search
CPC ......... H04W 52/38; H04W 4/38; H04W 4/80; H04W 48/08; H04W 84/12;
(Continued)

(56) References Cited

U.S. PATENT DOCUMENTS 6,859,609 B1 * 2/2005 Watkins ................. H04N 5/772
386/242
9,094,636 B1 * 7/2015 Sanders ................. H04W 52/38
(Continued)

FOREIGN PATENT DOCUMENTS

WO  WO-2017019700 A1 * 2/2017 ........... B64C 39/024
WO  2019/002179 A1  1/2019

OTHER PUBLICATIONS

Wei Zhu, Jidi Chen and Hong Sun. "Recording technology". China Communication University Press, Beijing, China, Jun. 2017, Recording art major "12th Five-Year" planning textbook, Aug. 2017.
(Continued)

*Primary Examiner* — Mahran Y Abu Roumi
(74) *Attorney, Agent, or Firm* — Bridgeway IP Law Group, PLLC; Sang Ho Lee; Hyun Woo Shin

(57) ABSTRACT

Provided is a multi-machine wireless synchronous recorder, which includes a power source module, an audio input module, an A/D conversion module, an SoC core module (including Bluetooth and WiFi communication modules), an audio thru module, a button module, an LED indication module, and a digital storage module. The power source module supplies power to the audio input module and controls an operation of the SoC core module; and the SoC core module controls the A/D conversion module, the button module, and the LED indication module, and the SoC core module performs bidirectional communication with the digital storage module and the internal Bluetooth and WiFi communication modules, respectively. The multi-machine wireless synchronous recorder is small in size, and by using wireless network technology, a plurality of recorders responsible for multi-track recording may be connected to form a wireless mesh network for synchronous recording. Further provided are corresponding recording system and method.

12 Claims, 2 Drawing Sheets

(51) Int. Cl.
*H04L 67/1095* (2022.01)
*H04M 1/72403* (2021.01)
*H04R 3/00* (2006.01)
*H04W 4/38* (2018.01)
*H04W 4/80* (2018.01)

(52) U.S. Cl.
CPC ........ *H04M 1/72403* (2021.01); *H04R 3/005* (2013.01); *H04W 4/38* (2018.02); *H04W 4/80* (2018.02)

(58) Field of Classification Search
CPC .. H04N 21/4126; H04R 29/004; G06F 3/165; G06F 3/16; G08C 25/02; H04L 67/06; H04L 67/025; H04L 67/1095
See application file for complete search history.

(56) References Cited

U.S. PATENT DOCUMENTS

| | | | |
|---|---|---|---|
| 2017/0124111 A1* | 5/2017 | Sharma | G06F 16/178 |
| 2018/0007634 A1* | 1/2018 | Pereira | H04W 52/0264 |
| 2019/0281935 A1* | 9/2019 | Gharabegian | G05B 15/02 |
| 2021/0132895 A1* | 5/2021 | Cengarle | G10L 25/06 |

OTHER PUBLICATIONS

Weigang Zhang. "Principle of Communication & Technology". Xidian University Press, Xian, China, May 2018.

\* cited by examiner

MULTI-MACHINE WIRELESS SYNCHRONOUS RECORDER, MULTI-TRACK RECORDING SYSTEM AND METHOD

CROSS-REFERENCE TO RELATED APPLICATION(S)

The present application is a bypass continuation application of international application No. PCT/CN2020/072908 filed on Jan. 19, 2020, and claims priority to Chinese patent application No. 201910432023.2 filed on May 23, 2019, the disclosures of which are hereby incorporated by reference in their entirety.

TECHNICAL FIELD

The present disclosure relates to a recording device field, and more specifically, to a multi-machine wireless synchronous recorder, a multi-machine wireless synchronous multi-track recording system and a multi-machine wireless synchronous multi-track recording method.

BACKGROUND ART

When a current multi-track recording device is applied to a recording of live music performances, it needs professional recording engineers perform a lot of work such as previous wiring connection and post wiring removal and gathering, including an operation of inputting all kinds of microphone and audio line signals into a multi-track recorder through a multi-channel mixer, and an operation of setting complex parameters and pre-tuning for the recorder. This not only costs high equipment costs but also a lot of time. At the same time, levels of recording engineers will also bring great uncertainty to a quality and a result of the recording. Moreover, a centralized multi-track recording device requires a large on-site space due to its large size and a lot of wirings, and is difficult to be used in many small and medium-sized performance venues with limited spaces. In addition, because all audio signal sources are collectively recorded in one multi-track recording project file in the current multi-track recording device, if each music player wants to get a separate recording file of his/her own performance, it needs ask the recording engineer to export multiple files track by track from the multi-track recording project file and forward it to everyone, which consumes a lot of time and effort.

SUMMARY

To resolve the problems of complicated operation, low efficiency, limited space, and a person being recorded incapable of obtaining a separate recording file of his/her own performance in time in current products and technologies, the present disclosure provides a multi-machine wireless synchronous recorder using wireless network technology. The recorder is small, adopts Bluetooth and WiFi technology to form a wireless mesh network and is connected to a cloud server deployed on the internet. And multiple recorders in the wireless mesh network may be remotely controlled at the same time to perform multi-track recording with synchronization time information by one recorder or an App of a mobile phone. Firstly, the audio is recorded on an internal memory of the present recorder, then the recording file on the internal memory is transmitted to the cloud server in real time, and finally the multi-track recording project file is automatically synthesized on the cloud server according to the synchronization time information in the recording files, thereby meeting the needs of highly flexible multi-track recording and real-time file sharing in the music scene.

According to a first aspect of the present disclosure, a multi-machine wireless synchronous recorder includes: a power source module, an audio input module, an A/D conversion module, an SoC core module (including Bluetooth and WiFi communication modules), an audio thru module, a button module, an LED indication module and a digital storage module. Wherein the power source module supplies power to the audio input module and controls an operation of the SoC core module; and the SoC core module controls the A/D conversion module, the button module and the LED indication module, and the SoC core module performs bidirectional communication with the digital storage module and the internal Bluetooth and WiFi communication modules, respectively.

Further, the power source module in the recorder is powered by a battery or USB power source.

Further, the Bluetooth communication module in the SoC core module in the recorder is connected to Bluetooth communication modules in other same recorders and Bluetooth of a mobile phone to form a Bluetooth mesh network.

Further, the WiFi communication module in the SoC core module in the recorder is connected to a dedicated cloud server deployed on the internet.

Further, the audio input module in the recorder is connected to an external microphone or line audio input, including a XLR/6.35 TRS Jack combo socket, a small 3.5 mm TRS Jack socket, and a RCA socket. With amplification and power supply circuits inside the audio input module, the audio input module is possible to receive audio signals from a stage wired microphone, a wireless microphone, a video microphone, a shotgun microphone, a lavalier microphone, and balanced and unbalanced lines, thereby being suitable for concert live recording and video shooting auxiliary recording.

Further, the A/D conversion module in the recorder converts the analog audio signals into a digital audio format, which is compatible with various sampling rates from 16 bits/44.1 kHz to 24 bits/192 kHz.

Further, the SoC core module in the recorder records the digital audio signals into an audio file and stores it on the digital storage module.

Further, the audio thru module in the recorder directly transmits the audio input signals with the highest fidelity to an external mixer connected to it.

Further, the internal digital storage module in the recorder adopts a SD card or a digital flash memory or a hard disk.

According to a second aspect of the present disclosure, a multi-machine wireless synchronous multi-track recording system includes: a plurality of the multi-machine wireless synchronous recorders as described above, a cloud server and a mobile phone, the Bluetooth communication module in the multi-machine wireless synchronous recorder is connected to the Bluetooth communication modules in other multi-machine wireless synchronous recorders and Bluetooth of the mobile phone to form a Bluetooth mesh network, and the WIFI communication modules in the plurality of multi-machine wireless synchronous recorders are connected to the cloud servers.

According to a third aspect of the present disclosure, a multi-machine wireless synchronous multi-track recording method, adopting the multi-machine wireless synchronous multi-track recording system as described above, includes the following steps:

a user pressing a recording button of any recorder in the Bluetooth mesh network or uses an App of the mobile phone to transmit control information of starting recording to all recorders in the Bluetooth mesh network through Bluetooth;

the SoC core module of each of the multi-machine wireless synchronous recorders starting to synchronously record audio signals transmitted from the audio input module to the A/D conversion module, and generating one audio file at regular intervals; and the SoC core module embedding an unified identification code of a current recording program in a head of the audio file and recording synchronization time information in a recording file, and then storing the recording file on the internal digital storage module; and at the same time, the SoC core module transmitting the recording file to the cloud server on the internet for storage through the WiFi communication module.

Further, the following step is further included: the cloud server automatically synthesizing a multi-track recording project file according to the synchronization time information in each recording files.

Further, the following steps are included before recording: the Bluetooth communication module in the SoC core module of each of the multi-machine wireless synchronous recorders receiving an instruction from the App of the mobile phone to set a WiFi connection address and password to be connected by the WiFi communication module in the SoC core module, and the multi-machine wireless synchronous recorder is connected to the cloud server deployed on the internet through WiFi, and the SoC core module in the multi-machine wireless synchronous recorder obtaining the synchronization time information through the cloud server or the App of the mobile phone.

The working principle of the present disclosure:

A preparatory work: the power source module 110 is started to control the recorders to be turned on. An App of the mobile phone is used to connect Bluetooth communication modules 142 in the SoC core modules 140 in the plurality of the same recorders through Bluetooth and to make the connected recorders form a Bluetooth mesh network. The App of the mobile phone is used to transmit a WiFi connection address and password to be connected to the WiFi communication modules 141 in the SoC core modules 140 of all the recorders in the mesh network through Bluetooth, and to connect all the recorders 100 to a dedicated cloud server deployed on the internet through WiFi. The SoC core modules 140 in the recorders obtain synchronization time information through the cloud server or the App of the mobile phone. The audio input modules are connected to line signals of the external microphones or electronic musical instruments for recording. And the audio thru modules 180 are connected to an external mixer 200 for live sound reinforcement.

Starting synchronized recording: a recording button of any recorder in the mesh network is pressed or control information of starting recording is transmitted to all the recorders in the mesh network using the App of the mobile phone through Bluetooth. And then the SoC core module 140 of each recorder starts to synchronously record audio signals transmitted from the audio input module 120 to the A/D conversion module 130, and generates one audio file at regular intervals. The SoC core module 140 embeds a unified identification code of a current recording program in the head of the audio file and records synchronization time information in a recording file, and then stores the recording file on the internal digital storage modules 170. At the same time, the SoC core module 140 transmits the recording file to the cloud server on the internet for storage and post-production through the WiFi communication module 141.

The beneficial effects of the present disclosure are: the multi-machine wireless synchronous recorder is small in size, and by using wireless network technology, the plurality of recorders responsible for multi-track recording may be connected to form a wireless mesh network for recording synchronously, each recorder is not limited by physical connection lines in a music scene, so it can be freely arranged in a location where different sound source is located, each user only needs to be responsible for simply connecting a line output of his/her own microphone or electronic musical instrument to the audio input module of the recorder, and connect an original connection line for live sound reinforcement to the audio thru module, headers of all recording files are embedded with a unified current recording program identification code and synchronization time information obtained from a cloud server or a mobile phone for synthesis of multi-track audio files, thereby effectively eliminating a lot of tedious work performed by the professional recording engineers such as previous wiring connection and post wiring removal and gathering, and a complicated operation of setting parameters and pre-tuning in the recorder, for traditional multi-track recorders. On the other hand, each user can instantly obtain a personal recording file from his/her own recorder storage and a cloud server space, and share a multi-track recording project file through the cloud server instantly, thereby greatly improving the efficiency of post-audio production.

BRIEF DESCRIPTION OF DRAWINGS

The features and advantages of the present disclosure will be more clearly understood by referring to the drawings, and the drawing are schematic and should not be deemed as imposing any restriction on the present disclosure, in the drawings.

DETAILED DESCRIPTION

In order to be able to understand the above objectives, features and advantages of the present disclosure more clearly, the present disclosure will be further described in detail below in conjunction with the drawings and specific embodiments. It should be noted that, in the case where there is no conflict, the embodiments of the present application and the features in the embodiments can be combined with each other.

In the following description, many specific details are set forth in order to fully understand the present disclosure. However, the present disclosure can also be implemented in other ways than those described here. Therefore, the protection scope of the present disclosure is not limited by the specific embodiments disclosed below.

Figure 1:
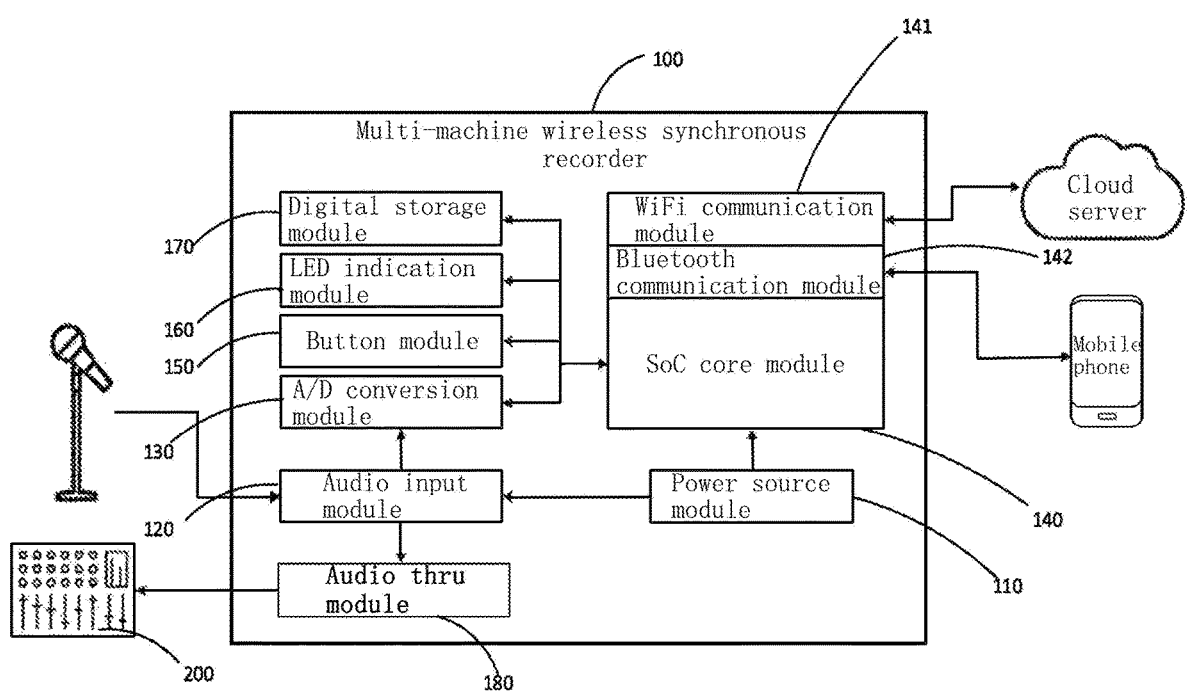
FIG. 1 is a schematic diagram of a system structure of the multi-machine wireless synchronous recorder in some embodiments of the present disclosure.
Figure 2:
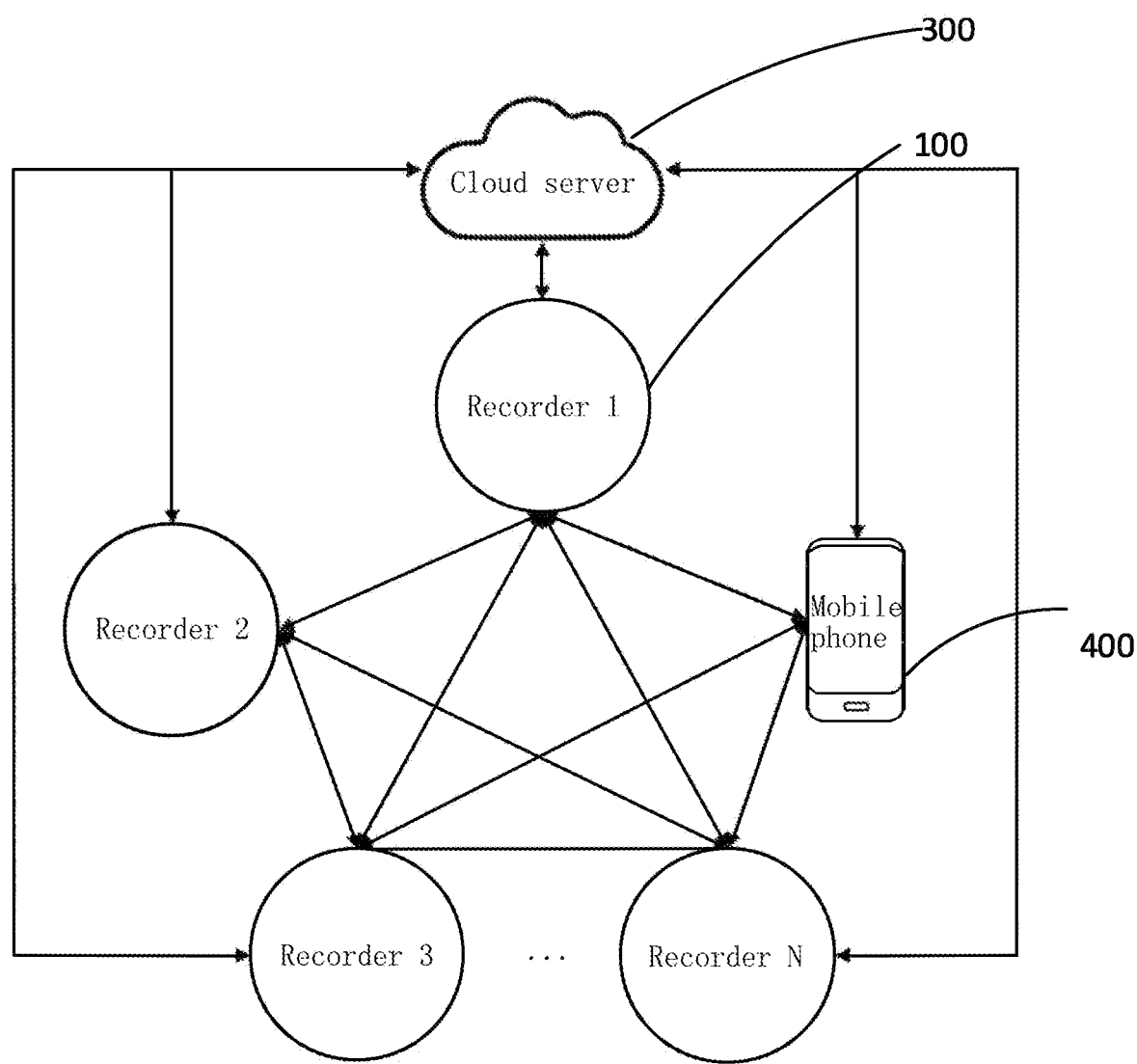
FIG. 2 is a schematic diagram of an external connection of the multi-machine wireless synchronous recorder in some embodiments of the present disclosure.

As shown in FIGS. 1 and 2, the present disclosure provides a multi-machine wireless synchronous recorder 100 with external communication, which includes a power source module 110, an audio input module 120, an A/D conversion module 130, an SoC core module 140, an audio thru module 180, a button module 150, an LED indication module 160 and a digital storage module 170, wherein the power source module 110 supplies power to the audio input module 120 and controls an operation (for example, power-on and power-off) of the SoC core module 140; and the SoC core module 140 connects to and controls the A/D conversion module 130, the button module 150, the LED indication module 160 and the digital storage module 170, and the SoC core module 140 performs bidirectional communications with the digital storage module 170 and a Bluetooth communication module 142 and a WiFi communication module 141 inside the SoC core module 140, respectively. The Bluetooth communication module 142 and the WiFi communication module 141 perform information transmission with external devices. A plurality of recorders 100 form a Bluetooth network through the Bluetooth communication modules and Bluetooth of mobile phones. The present disclosure provides a recording device of hardware, which makes the plurality of recorders responsible for multi-track recording be connected to form a wireless mesh network for recording synchronously by using a wireless network technology, each recorder is not limited by physical connection lines in a music scene, so it can be freely arranged in a location where different sound source is located, each user only needs to be responsible for simply connecting a line output of his/her own microphone or electronic musical instrument to the audio input module of the recorder, and connect an original connection line for live sound reinforcement to the audio thru module, headers of all recording files are embedded with a unified current recording program identification code and synchronization time information obtained from a cloud server or a mobile phone for synthesis of multi-track audio files, thereby effectively eliminating a lot of tedious work performed by the professional recording engineers such as previous wiring connection and post wiring removal and gathering, and a complicated operation of setting parameters and pre-tuning in the recorder, for traditional multi-track recorders. On the other hand, each user can instantly obtain a personal recording file from his/her own recorder storage and a cloud server space, and share a multi-track recording project file through the cloud server instantly, thereby greatly improving the efficiency of post-audio production.

The operating principle is as follows:

A preparatory work: the power source module 110 is started to control the recorders to be turned on. An App of the mobile phone is used to connect Bluetooth communication modules 142 in the SoC core modules 140 in the plurality of the same recorders through Bluetooth and to make the connected recorders form a Bluetooth mesh network. The App of the mobile phone is used to transmit a WiFi connection address and password to be connected to the WiFi communication modules 141 in the SoC core modules 140 of all the recorders in the mesh network through Bluetooth, and to connect all the recorders 100 to a dedicated cloud server deployed on the internet through WiFi. The SoC core modules 140 in the recorders obtain synchronization time information through the cloud server or the App of the mobile phone. The audio input modules are connected to line signals of the external microphones or electronic musical instruments for recording. And the audio thru modules 180 are connected to an external mixer 200 for live sound reinforcement.

Starting synchronized recording: a recording button of any recorder in the mesh network is pressed or control information of starting recording is transmitted to all the recorders in the mesh network using the App of the mobile phone through Bluetooth. And then the SoC core module 140 of each recorder starts to synchronously record audio signals transmitted from the audio input module 120 to the A/D conversion module 130, and generates one audio file at regular intervals. The SoC core module 140 embeds a unified identification code of a current recording program in a head of the audio file and records synchronization time information in a recording file, and then stores the recording file on the internal digital storage modules 170. At the same time, the SoC core module 140 transmits the recording file to the cloud server on the internet for storage and post-production through the WiFi communication module 141.

Further, the power source module 110 in the recorder 100 is powered by a battery or USB power source. The power supply module 110 is started to control the audio input module 120 and the SoC core module 140 to enter working state.

Further, the Bluetooth communication module 142 in the SoC core module 140 in the recorder 100 is connected to the Bluetooth communication modules 142 in other same recorders and the Bluetooth of the mobile phone to form the Bluetooth mesh network.

Further, the Bluetooth communication module 142 in the SoC core module 140 of the recorder 100 receives an instruction from the App of the mobile phone to set a WiFi connection address and password to be connected to by the WiFi communication module 141 in the SoC core module 140, and the recorder 100 is connected to the cloud server deployed on the internet through WiFi.

Further, the audio input module 120 in the recorder 100 is connected to an external microphone or line audio input, including a XLR/6.35 TRS Jack combo socket, a 3.5 mm TRS Jack socket, and a RCA socket. With internal signal amplification and power supply circuits, the audio input module 120 is possible to receive audio signals from a stage wired microphone, a wireless microphone, a video microphone, a shotgun microphone, a lavalier microphone, and balanced and unbalanced lines, and transmit the signals to the A/D conversion module 130. The recorder is suitable for various live recordings of concerts, conferences, group teaching and auxiliary recording of video shooting.

Further, the A/D conversion module 130 in the recorder 100 converts the analog audio signals from the audio input module 120 into digital audio format, which is compatible with various sampling rates from 16 bits/44.1 kHz to 24 bits/192 kHz.

Further, when a recording button of the button module 150 in the recorder 100 is pressed, the SoC core module 140 is controlled to start to record digital audio signals transmitted from the audio input module 120 to the A/D conversion module 130, and generate one audio file at regular intervals, and then store the file on the digital storage module 170.

Further, the audio thru module 180 in the recorder 100 directly transmits the audio input signals with the highest fidelity to an external mixer 200 connected to it.

Further, the internal digital storage module 170 in the recorder 100 adopts SD card or digital flash memory or hard disk to locally store the audio files recorded by the SoC core module 140.

Further, the SoC core module 140 in the recorder 100 automatically transmits the already recorded audio files to the cloud server deployed on the internet through the internal WiFi communication module 141 for backup storage. The SoC core module 140 will compare the files in the digital storage module 170 with the synchronized backup results of the files on the cloud server at any time. If the capacity of the digital storage module is insufficient, the SoC core module 140 will automatically delete the files that were recorded first and have been fully synchronized to the cloud server in a sequential order of recording time, freeing up the recording capacity for the digital storage module 170.

In the second aspect, the present disclosure provides a multi-machine wireless synchronous multi-track recording system, including a plurality of the above multi-machine wireless synchronous recorders 100, a cloud server 300 and a mobile phone 400, the Bluetooth communication module 141 in the multi-machine wireless synchronous recorder 100 is connected to the Bluetooth communication modules in other multi-machine wireless synchronous recorders and Bluetooth of the mobile phone to form a Bluetooth mesh network, and the WIFI communication modules 141 in the plurality of multi-machine wireless synchronous recorders 100 are connected to the cloud server 300.

In the third aspect, the present disclosure provides a multi-machine wireless synchronous multi-track recording method, adopting the above multi-machine wireless synchronous multi-track recording system, and including the following steps:
- a user presses a recording button of any recorder in the Bluetooth mesh network or uses an App of the mobile phone to transmit control information of starting recording to all recorders in the Bluetooth mesh network through Bluetooth;
- the SoC core module 140 of each of the multi-machine wireless synchronous track recorders 100 starts to synchronously record audio signals transmitted from the audio input module 120 to the A/D conversion module 130, and generates one audio file at regular intervals; and the SoC core module 140 embeds an unified identification code of a current recording program in the head of the audio file and records synchronization time information in a recording file, and then stores the recording file on the internal digital storage module 170; and
- at the same time, the SoC core module 140 transmits the recording file to the cloud server 300 on the internet for storage through the WiFi communication module 141.

Further, the following step is further included: the cloud server 300 automatically synthesizes a multi-track recording project file according to the synchronization time information in each recording files.

Further, the following steps are included before recording: the Bluetooth communication module 142 in the SoC core module 140 of each of the multi-machine wireless synchronous recorders 100 receives an instruction from the App of the mobile phone to set a WiFi connection address and password to be connected by the WiFi communication module 141 in the SoC core module, and each of the multi-machine wireless synchronous recorders 100 is connected to the cloud server 300 deployed on the internet through WiFi, and the SoC core module 140 in each of the multi-machine wireless synchronous recorders 100 obtains the synchronization time information through the cloud server 300 or the mobile phone 400.

The beneficial effects of the present disclosure are: By adopting an audio interface compatible with all microphones and line signals and a high-sampling AD converter, it is possible to automatically transmit the recording files of various live recordings of concerts, conferences, and group teachings and auxiliary recordings of video shooting to the cloud server in real time through the synchronous storages of the local recording and the cloud server, which effectively solves the time-consuming and inefficient problems caused by a lot of tedious work of manually dumping and transmitting files of the current recorders, eliminates a hidden danger of insufficient storage capacity of portable recorders, and greatly facilitates off-site audio editors download recording files synchronously and perform post-editing work in time.

In the present disclosure, the terms "first", "second", and "third" are only used for descriptive purposes, and cannot be understood as indicating or implying relative importance. The term "plurality" refers to two or more, unless specifically defined otherwise.

The above descriptions are only preferred embodiments of the present disclosure and are not intended to limit the present disclosure. For those skilled in the art, the present disclosure can have various amendments and changes. Any amendment, equivalent replacement, improvement and the like made within the spirit and principle of the present disclosure should be included in the protection scope of the present disclosure.

What is claimed is:

1. A multi-machine wireless synchronous system, comprising a plurality of multi-machine wireless synchronous recorders, a cloud server deployed on Internet and a mobile phone, wherein each of the plurality of a multi-machine wireless synchronous recorders comprises: a power source module, an audio input module, an A/D conversion module, an SoC core module, an audio thru module, a button module, an LED indication module and a digital storage module, wherein the power source module supplies power to the audio input module and controls an operation of the SoC core module, the SoC core module is connected to the A/D conversion module, the button module, the LED indication module, and the digital storage module, the A/D conversion module and the audio thru module are connected to the audio input module, the SoC core module comprises a Bluetooth communication module and a WiFi communication module, and the SoC core module performs bidirectional communication with the digital storage module and the Bluetooth communication module and the WiFi communication module, respectively;

wherein the Bluetooth communication module is connected to Bluetooth communication modules in other multi-machine wireless synchronous recorders and a Bluetooth communication module of a mobile phone to form a Bluetooth mesh network, the Bluetooth communication module is used to transmit control information of starting recording to all recorders in the Bluetooth mesh network through Bluetooth, or to receive the control information of starting recording from any recorder of all recorders and the mobile phone in the Bluetooth mesh network through Bluetooth, and the WiFi communication modules of the plurality of multi-machine wireless synchronous recorders are connected to the cloud server;

wherein the WiFi communication module is used to connect to the cloud server, and the SoC core module records audio signals transmitted from the audio input module to the A/D conversion module into a recording file, and transmits the recording file to the cloud server for storage through the WiFi communication module such that the recording file is to be synthesized with other recording files transmitted by multi-machine wireless synchronous recorders in the Bluetooth mesh network into a multi-track recording project file by the cloud server;

wherein the SoC core module of each of the plurality of multi-machine wireless synchronous recorders embeds a unified identification code of a current recording program in a header of the recording file and recording a synchronization time information in the recording file; and wherein the cloud server automatically synthesizes the recording files transmitted by the plurality of multi-machine wireless synchronous recorders in the Bluetooth mesh network into a multi-track recording project file by automatically synthesizing, by cloud server, the recording files transmitted by the plurality of multi-machine wireless synchronous recorders in the Bluetooth mesh network into the multi-track recording project file according to the synchronization time information in each recording file.

2. The multi-machine wireless synchronous system of claim 1, wherein the Bluetooth communication module receives an instruction from an App of the mobile phone to set a WiFi connection address and password to be connected by the WiFi communication module in the SoC core module, and the SoC core module obtains the synchronization time information through the cloud server or the App of the mobile phone.

3. The multi-machine wireless synchronous system of claim 1, wherein the SoC core module stores the recording file on the digital storage module.

4. The multi-machine wireless synchronous system of claim 1, wherein the audio thru module is used to directly transmit an audio input signal with the highest fidelity to an external mixer connected to it.

5. The multi-machine wireless synchronous system of claim 1, wherein the SoC core module embeds unified identification code of a current recording program in a header of the recording file and records the synchronization time information in the recording file.

6. The multi-machine wireless synchronous multi-track recording system of claim 1, wherein the SOC core module of each of the plurality of multi-machine wireless synchronous recorders stores its recording file on the digital storage module of the multi-machine wireless synchronous recorder.

7. The multi-machine wireless synchronous multi-track recording system of claim 1, wherein the audio thru module of each of the plurality of the multi-machine wireless synchronous recorders is used to directly transmit an audio input signal with the highest fidelity to an external mixer connected to it.

8. A multi-machine wireless synchronous multi-track recording method, adopting the multi-machine wireless synchronous multi-track recording system of claim 1, and comprising the following steps:

transmitting, by any one of the plurality of multi-machine wireless synchronous recorders and the mobile phone of the multi-machine wireless synchronous multi-track recording system, control information of starting recording to the plurality of multi-machine wireless synchronous-recorders in the Bluetooth mesh network through Bluetooth;

recording, synchronously by the SoC core module of each of the plurality of multi-machine wireless synchronous track recorders, audio signals transmitted from the audio input module to the A/D conversion module, and generating one recording file at regular intervals;

transmitting, by the SOC core module, the recording file to the cloud server on the internet for storage through the WiFi communication module; and automatically synthesizing, by the cloud server, the recording files transmitted by the plurality of multi-machine wireless synchronous recorders in the Bluetooth mesh network into a multi-track recording project file.

9. The multi-machine wireless synchronous multi-track recording method of claim 8, further comprising the following steps before recording:

receiving, by the Bluetooth communication module in the SoC core module of the multi-machine wireless synchronous recorder, an instruction from the App of the mobile phone to set a WiFi connection address and password to be connected by the WiFi communication module in the SoC core module in the multi-machine wireless synchronous recorder, and obtaining, by the SoC core module in the multi-machine wireless synchronous recorder, the synchronization time information through the cloud server or the App of the mobile phone.

10. The multi-machine wireless synchronous multi-track recording method of claim 8, further comprising: storing, by the SoC core module of each of the plurality of multi-machine wireless synchronous recorders, its recording file on the digital storage module of the multi-machine wireless synchronous recorder.

11. The multi-machine wireless synchronous multi-track recording method of claim 8, further comprising: directly transmitting, by the audio thru module of each of the plurality of multi-machine wireless synchronous recorders, an audio input signal with the highest fidelity to an external mixer connected to it.

12. The multi-machine wireless synchronous multi-track recording system of claim 1, wherein the Bluetooth communication module of each of the plurality of multi-machine wireless synchronous recorders receives an instruction from an App of the mobile phone to set a WiFi connection address and password to be connected by the WiFi communication module in the SoC core module of the multi-machine wireless synchronous recorder, and the SoC core module of the multi-machine wireless synchronous recorder obtains the synchronization time information through the cloud server or the App of the mobile phone.

* * * * *